United States Patent
French et al.

(10) Patent No.: US 11,674,064 B2
(45) Date of Patent: Jun. 13, 2023

(54) SEALANT COMPOSITION

(71) Applicant: PPG Architectural Finishes, Inc., Pittsburgh, PA (US)

(72) Inventors: Maria S. French, Canfield, OH (US); Glen J. Kaszubski, Copley, OH (US); Melissa L. Gerhart, Cheswick, PA (US)

(73) Assignee: PPG Architectural Finishes, Inc., Pittsburgh, PA (US)

( * ) Notice: Subject to any disclaimer, the term of this patent is extended or adjusted under 35 U.S.C. 154(b) by 765 days.

(21) Appl. No.: 16/490,375

(22) PCT Filed: Mar. 1, 2018

(86) PCT No.: PCT/US2018/020429
§ 371 (c)(1),
(2) Date: Aug. 30, 2019

(87) PCT Pub. No.: WO2018/160820
PCT Pub. Date: Sep. 7, 2018

(65) Prior Publication Data
US 2020/0010747 A1 Jan. 9, 2020

Related U.S. Application Data

(60) Provisional application No. 62/465,900, filed on Mar. 2, 2017.

(51) Int. Cl.
*C09D 183/06* (2006.01)
*C09K 3/10* (2006.01)
*C08L 83/04* (2006.01)
*C08L 83/06* (2006.01)
*C08L 83/08* (2006.01)
*C09D 183/04* (2006.01)
*C09D 183/08* (2006.01)

(52) U.S. Cl.
CPC ............ *C09K 3/1018* (2013.01); *C08L 83/04* (2013.01); *C08L 83/06* (2013.01); *C08L 83/08* (2013.01); *C09D 183/04* (2013.01); *C09D 183/06* (2013.01); *C09D 183/08* (2013.01); *C08L 2205/025* (2013.01); *C09K 2200/0685* (2013.01)

(58) Field of Classification Search
CPC ........ C08G 77/16; C08G 77/26; C08G 77/18; C08G 77/20; C08G 77/46; C09D 183/06
See application file for complete search history.

(56) References Cited

U.S. PATENT DOCUMENTS

| | | | |
|---|---|---|---|
| 5,429,771 A * | 7/1995 | Fleuren | B01D 19/0409 510/424 |
| 6,506,279 B1 | 1/2003 | Luft et al. | |
| 2010/0234517 A1 | 9/2010 | Plantenberg et al. | |

FOREIGN PATENT DOCUMENTS

WO 2013/000478 A1 1/2013

* cited by examiner

*Primary Examiner* — Kuo Liang Peng
(74) *Attorney, Agent, or Firm* — Charles M. Yeomans

(57) ABSTRACT

The present invention is directed to a sealing composition comprising: (a) a polysiloxane; (b) a reactive polysiloxane comprising at least one reactive functional group; and (c) water; wherein the weight ratio of polysiloxane to reactive polysiloxane is from 2.7:1 to 4:1. Also disclosed are coated substrates and methods of coating a substrate.

26 Claims, No Drawings

SEALANT COMPOSITION

CROSS-REFERENCE TO RELATED APPLICATIONS

This application claims the benefit of U.S. Provisional Patent Application Ser. No. 62/465,900, filed on Mar. 2, 2017, incorporated herein by reference.

FIELD OF THE INVENTION

The present invention is directed towards a sealing composition, treated substrates and methods of coating substrates.

BACKGROUND OF THE INVENTION

Cellulosic and cementitious materials, such as wood and composite wood materials and masonry materials, such as brick, stone, cement and concrete, are commonly used building materials in the construction industry. These materials are porous and permeable to water, and moisture may penetrate into the material causing damage through expansion by freeze-thaw cycles and through the promotion of microbial degradation, such as from fungi, moss, etc. As these materials are often exposed to environmental conditions, preventing water from penetrating into the materials is important to prolong the useful lifetime of these materials.

Water repellant sealing compositions to protect such materials are known in the art. However, these compositions may lack on-the-shelf stability, sufficient durability once applied to a substrate, or may contain an undesirable amount of volatile organic content ("VOC").

Therefore, a low-VOC sealing composition that possesses on-the-shelf stability and durability once applied to a substrate is desired.

SUMMARY OF THE INVENTION

The present invention provides a sealing composition comprising: (a) a polysiloxane; (b) a reactive polysiloxane comprising at least one reactive functional group; and (c) water; wherein the weight ratio of polysiloxane to reactive polysiloxane is from 1.7:1 to 4:1.

The present invention also provides a method of coating a substrate comprising applying a sealing composition comprising (a) a polysiloxane; (b) a reactive polysiloxane comprising at least one reactive functional group; and (c) water; wherein the weight ratio of polysiloxane to reactive polysiloxane is from 1.7:1 to 4:1, to the surface of the substrate.

The present invention further provides a substrate at least partially coated by a sealing composition comprising (a) a polysiloxane; (b) a reactive polysiloxane comprising at least one reactive functional group; and (c) water; wherein the weight ratio of polysiloxane to reactive polysiloxane is from 1.7:1 to 4:1.

The present invention also provides a flexible packaging comprising a sealing composition comprising (a) a polysiloxane; (b) a reactive polysiloxane comprising at least one reactive functional group; and (c) water; wherein the weight ratio of polysiloxane to reactive polysiloxane is from 1.7:1 to 4:1.

DETAILED DESCRIPTION OF THE INVENTION

The present invention is directed to a sealing composition comprising, consisting essentially of, or consisting of: (a) a polysiloxane; (b) a reactive polysiloxane comprising at least one reactive functional group; and (c) water; wherein the weight ratio of polysiloxane to reactive polysiloxane is from 1.7:1 to 4:1.

According to the present invention, the sealing composition comprises a polysiloxane. Polysiloxanes generally comprise an inorganic silicon-oxygen backbone chain with organic groups attached to the silicon atoms. The inorganic silicon-oxygen backbone chain may be a straight chain or may be branched. The polysiloxane may comprise at least one silicone resin. The silicone resin may comprise a branched or cage-like structure. For clarity, the polysiloxane of the present invention is free of reactive functional groups, as defined herein, and the polysiloxane is different from the reactive polysiloxane, as also defined herein. Additionally, although the polysiloxane is free of the reactive functional groups as defined herein, this does not preclude the polysiloxane from chemically reacting through other means, and further does not preclude chemical reactions of the polysiloxane that produce the reactive functional groups after the sealing composition has been applied to a substrate, such as, for example, through UV degradation of the polysiloxane from exposure to the sun.

The organic groups may comprise alkyl groups, such as methyl, ethyl or propyl groups, aryl groups, such as phenyl groups, or combinations thereof. For example, the polysiloxane may comprise polydimethylsiloxane ("PDMS"), polydiphenylsiloxane, or a silsesquioxane. The organic groups may comprise (meth)acrylate or polyether groups comprising esters, ethers, and the like. For example, the organic groups may comprise a straight chain or branched polyether comprising an ethoxylated alcohol, such as, e.g., branched ethoxylated tridecanol. The organic group may comprise a homopolymer or copolymer of ethylenically unsaturated monomers, such as, e.g., a butyl acrylate-methacrylic acid-methylmethacrylate copolymer.

The polysiloxane may also comprise a cyclic polysiloxane or may comprise cyclic polysiloxane groups. As used herein, the term "cyclic polysiloxane" refers to a cyclic chain of alternating silicon and oxygen atoms with organic groups attached to the silicon atoms. The organic groups may comprise alkyl groups, such as methyl, ethyl or propyl groups, aryl groups, such as phenyl groups, or combinations thereof. For example, the cyclic siloxane may comprise hexamethylcyclotrisiloxane, octamethylcyclotetrasiloxane, decamethylcyclopentasiloxane, dodecamethylcyclohexasiloxane, or combinations thereof.

The polysiloxane may also comprise alkoxy groups. The alkoxy groups may include $C_1$ to $C_6$ alkoxy groups, such as methoxy, ethoxy, propoxy, butoxy, pentoxy, hexoxy, or combinations thereof.

The polysiloxane may also comprise mixtures of the above described materials. For example, the polysiloxane may comprise, consist essentially of, or consist of polydimethylsiloxane, silsesquioxane, polydiphenylsiloxane, silicone resin, cyclic polysiloxane, or combinations thereof.

Non-limiting examples of commercially available materials that include polysiloxane, such as polydimethylsiloxane, silsesquioxane, polydiphenylsiloxane, silicone resin, cyclic polysiloxane, or combinations thereof, that may be used in the present invention include Silres® BS 50, Silres BS 60, and Silres WH, available from Wacker Chemie AG, and Dow Corning® 902H, available from Dow Corning Corporation.

The polysiloxane may be present in an amount of at least 20% by weight, such as at least 60% by weight, such as at least 66% by weight, such as at least 68% by weight, and may be present in an amount of no more than 82% by weight, such as no more than 80% by weight, such as no more than 75% by weight, such as no more than 72% by weight, based on the total solids weight of the sealing composition. The polysiloxane may be present in an amount of 20% to 82% by weight, such as 60% to 80% by weight, such as 66% to 75% by weight, such as 68% to 72% by weight, based on the total solids weight of the sealing composition.

According to the present invention, the sealing composition comprises a reactive polysiloxane. The reactive polysiloxane differs from the polysiloxane described above in that it comprises at least one reactive functional group. The reactive polysiloxane may comprise any of the polysiloxanes described above further comprising at least one reactive functional group. As used herein, a "reactive functional group" refers to active hydrogen-containing functional groups, such as primary or secondary amino functional groups, hydroxyl functional groups, or combinations thereof, and specifically excludes alkoxy groups. The term "active hydrogen-containing functional groups" refers to those functional groups that are reactive with isocyanates as determined by the Zerewitnoff test as is described in the JOURNAL OF THE AMERICAN CHEMICAL SOCIETY, Vol. 49, page 3181 (1927), such as primary or secondary amino functional groups and hydroxyl functional groups. Accordingly, the reactive polysiloxane may comprise primary amino groups, secondary amino functional groups, hydroxyl functional groups, or combinations thereof. The amino-functional groups may be present as amino-alkyl functional groups. The reactive polysiloxane may comprise an amino-functional polysiloxane, a hydroxyl-functional polysiloxane, or combinations thereof. In addition to at least one functional group, the reactive polysiloxane may comprise alkoxy groups. The alkoxy groups may comprise $C_1$ to $C_6$ alkoxy groups, such as methoxy, ethoxy, propoxy, butoxy, pentoxy, hexoxy, or combinations thereof.

In addition to the reactive functional group, the reactive polysiloxane comprises an inorganic silicon-oxygen backbone chain (polysiloxane) with organic groups attached to the silicon atoms. The organic groups may comprise alkyl groups, such as methyl, ethyl or propyl, aryl groups, such as phenyl groups, or combinations thereof. For example, the reactive polysiloxane may comprise polydimethylsiloxane ("PDMS") comprising at least one functional group or silsesquioxane comprising at least one functional group. The inorganic silicon-oxygen backbone chain may be a straight chain or may be branched. The polysiloxane portion of the reactive polysiloxane may comprise any of the polysiloxanes described above.

Non-limiting examples of commercially available reactive polysiloxanes that may be used in the present invention include Silres BS 32A, Silres BS 1340, Silres BS 1360 and Silres BS 1306 available from Wacker Chemie AG, Dow Corning 84, Dow Corning 87, Dow Corning, 1-6184, Dow Corning IE 6694, Dow Corning IE 6683, Dow Corning 6696, Dow Corning 901H, Dow Corning 906H, and Dow Corning 904H available from Dow Corning Corporation.

The reactive polysiloxane may be present in an amount of at least 8% by weight, such as at least 20% by weight, such as at least 25% by weight, such as at least 28% by weight, and may be present in an amount of no more than 42% by weight, such as no more than 40% by weight, such as no more than 34% by weight, such as no more than 32% by weight, based on the total solids weight of the sealing composition. The reactive polysiloxane may be present in an amount of 8% to 42% by weight, such as 20% to 40% by weight, such as 25% to 34% by weight, such as 28% to 32% by weight, based on the total solids weight of the sealing composition.

The solids weight ratio of polysiloxane to reactive polysiloxane may be at least 1.7:1, such as at least 2:1, such as at least 2.1:1, such as at least 2.2:1, and may be no more than 4:1, such as no more than 3.5:1, such as no more than 3:1, such as no more than 2.9:1, such as no more than 2.5:1. The solids weight ratio of polysiloxane to reactive polysiloxane may be 1.7:1 to 4:1, such as 2:1 to 4:1, such as 2:1 to 3.5:1, such as 2:1 to 3:1, such as 2.1:1 to 3:1, such as 2.2:1 to 2.9:1, such as 2.2:1 to 2.5:1.

According to the present invention, the sealing composition further comprises water. The water may comprise tap water, deionized water, or combinations thereof. The sealing composition may also optionally comprise organic solvents.

The sealing composition may be in the form of a concentrate. The total solids of the concentrate may be at least 30% by weight, based on the total weight of the sealing composition, such as at least 40% by weight, such as at least 45% by weight, and may be no more than 70% by weight, such as no more than 65%, such as no more than 61%. The total solids of the concentrate may be 30% to 70%, based on the total weight of the sealing composition, such as 40% to 65%, such as 45% to 61%. Accordingly, water may be present in an amount of at least 30% by weight, such as at least 35% by weight, such as at least 39% by weight, and may be present in an amount of no more than 70% by weight, such as no more than 60% by weight, such as no more than 55% by weight. Water may be present in an amount of 30% to 70% by weight, such as 35% to 60% by weight, such as 39% to 55% by weight.

The sealing composition may alternatively be in a diluted and ready-to-use form. The total solids of the diluted sealing composition may be at least 0.5% by weight, based on the total weight of the sealing composition, such as at least 1% by weight, such as at least 1.5% by weight, and may be no more than 10% by weight, such as no more than 5% by weight, such as no more than 4% by weight. The total solids of the diluted sealing composition may be 0.5% to 10% by weight, based on the total weight of the sealing composition, such as 1% to 5% by weight, such as 1.5% to 4% by weight. Accordingly, water may be present in an amount of at least 90% by weight, such as at least 95% by weight, such as at least 96% by weight, and may be present in an amount of no more than 99.5% by weight, such as no more than 99% by weight, such as no more than 98.5% by weight. Water may be present in an amount of 90% to 99.5% by weight, such as 95% to 99% by weight, such as 96% to 98.5% by weight.

According to the present invention, the sealing composition may optionally further comprise an alkoxy silane. As used herein, the term "alkoxy silane" refers to compounds comprising one silicon atom and at least one alkoxy group. The alkoxy silane may comprise an alkyl trialkoxy silane represented by the formula: $(R_1O)_3SiR_2$, wherein each $R_1$ independently represents a $C_1$ to $C_6$ alkyl group and $R_2$ represents a $C_1$ to $C_{20}$ alkyl group. For example, the alkoxy silane may comprise trimethoxypropyl silane, triethoxyisobutyl silane, triethoxyoctyl silane, and the like.

Non-limiting examples of commercially available alkoxy silane that may be used in the present invention include Dow Corning IE 6692 available from Dow Corning Corporation, Protectosil® AQUA-TRETE® 40, Protectosil AQUA-TRETE 20, Protectosil AQUA-TRETE CONCENTRATE, Protectosil CHEM-TRETE® 40 VOC, and Protectosil CHEM-TRETE BSM 400 available from Evonik Industries.

According to the present invention, the sealing composition may be substantially free, essentially free, or completely free of alkoxy silane. As used herein, a sealing composition is substantially free of alkoxy silane if the sealing composition comprises less than 3% by weight of alkoxy silane, based on the total solids weight of the sealing composition. As used herein, a sealing composition is essentially free of alkoxy silane if the sealing composition comprises less than 1% by weight of alkoxy silane, based on the total solids weight of the sealing composition. As used herein, a sealing composition is completely free of alkoxy silane if alkoxy silane is not present in the sealing composition, i.e. 0.0% by weight, based on the total solids weight of the sealing composition.

According to the present invention, the sealing composition may be substantially free, essentially free or completely free of nitrogen-containing emulsifier. As used herein, a sealing composition is substantially free of nitrogen-containing emulsifier if the sealing composition comprises less than 1% by weight of nitrogen-containing emulsifier, based on the total solids weight of the sealing composition. As used herein, a sealing composition is essentially free of nitrogen-containing emulsifier if the sealing composition comprises less than 0.1% by weight of nitrogen-containing emulsifier, based on the total solids weight of the sealing composition. As used herein, a sealing composition is completely free of nitrogen-containing emulsifier if the sealing composition does not comprise nitrogen-containing emulsifier, i.e., 0.0% by weight, based on the total solids weight of the sealing composition.

According to the present invention, the sealing composition may be substantially free, essentially free or completely free of glycoside-containing emulsifier. As used herein, a sealing composition is substantially free of glycoside-containing emulsifier if the sealing composition comprises less than 1% by weight of glycoside-containing emulsifier, based on the total solids weight of the sealing composition. As used herein, a sealing composition is essentially free of glycoside-containing emulsifier if the sealing composition comprises less than 0.1% by weight of glycoside-containing emulsifier, based on the total solids weight of the sealing composition. As used herein, a sealing composition is completely free of glycoside-containing emulsifier if the sealing composition does not comprise glycoside-containing emulsifier, i.e., 0.0% by weight, based on the total solids weight of the sealing composition.

According to the present invention, the sealing composition may be substantially free, essentially free or completely free of anionic emulsifier. As used herein, a sealing composition is substantially free of anionic emulsifier if the sealing composition comprises less than 1% by weight of anionic emulsifier, based on the total solids weight of the sealing composition. As used herein, a sealing composition is essentially free of anionic emulsifier if the sealing composition comprises less than 0.1% by weight of anionic emulsifier, based on the total solids weight of the sealing composition. As used herein, a sealing composition is completely free of anionic emulsifier if the sealing composition does not comprise anionic emulsifier, i.e., 0.0% by weight, based on the total solids weight of the sealing composition.

According to the present invention, the sealing composition may optionally comprise a thickener. The thickener may comprise any suitable thickener known in the art. The thickener may comprise, for example, an acrylic copolymer, xanthum gum, colloidal layered silicate, or combinations thereof. Suitable commercially available acrylic copolymer thickeners include Acrysol TT-6615 available from The Dow Chemical Company. Suitable commercially available colloidal layered silicates include those sold under the Laponite® trade name available from BYK Additives and Instruments. Alternatively, the composition may be substantially free, essentially free, or completely of a thickener.

According to the present invention, the sealing composition may optionally comprise an acrylic resin. Acrylic resin refers to polymers produced from derived from acrylic acid, methacrylic acid, (meth)acrylic monomers, and/or other ethylenically unsaturated monomers. Suitable commercially available acrylic resin includes, for example, Rhoplex PR-33 available from The Dow Chemical Company. When present, the acrylic resin may be present in an amount of 5% to 65% by weight, such as 40% to 60% by weight, such as 50% to 57% by weight, based on the total solids weight of the sealing composition. Alternatively, the sealing composition may be substantially free, essentially free, or completely free of acrylic resin.

According to the present invention, the sealing composition may comprise other additives known in the industry, such as, for example, fungicides, biocides, mildewcides, dispersants, surfactants, wetting agents, hindered amine light stabilizers, ultraviolet radiation absorbers, waxes, or combinations thereof. Suitable commercially available waxes include a paraffin wax and polyethylene emulsion wax available as Michem Emulsion 66035 from Michelman, Inc. Alternatively, the sealing composition may be substantially free, essentially free, or completely free of any of these additives.

According to the present invention, the sealing composition may optionally comprise a colorant, such as a tint, pigment, or dye. The sealing composition may be in the form of a stain or toner when a colorant is present. A colorant may include, for example, a finely divided solid powder that is insoluble, but wettable, under the conditions of use. A colorant can be organic or inorganic and can be agglomerated or non-agglomerated. The colorant may comprise a pigment or a mixture or combination of pigments. The pigment(s) may comprise any suitable pigment known in the art. For example, the pigment(s) may comprise iron oxide, a transparent iron-oxide pigment, and the like. The pigment(s) may be present in the sealing composition in an amount of at least 0.1% by weight, such as at least 1% by weight, such as at least 1.5% by weight, based on the total weight of the sealing composition. The pigment(s) may for example be present in an amount of no more than 3% by weight, such as no more than 2.5% by weight, such as no more than 2% by weight, based on the total weight of the sealing composition. If used, the pigment(s) may for example be present in the sealing composition in an amount of 0.1% to 3% by weight, such as 1% to 2.5% by weight, such as 1.5% to 2% by weight, based on the total weight of the sealing composition. Alternatively, the sealing composition may be substantially free, essentially free, or completely free of pigment.

According to the present invention, the sealing composition may be substantially free, essentially free, or completely free of ultraviolet radiation absorbing agents. As used herein, a sealing composition is substantially free of ultraviolet radiation absorbing agents if the sealing composition comprises no more than 0.5% by weight ultraviolet radiation absorbing agents, based on the total weight of the sealing composition. As used herein, a sealing composition is essentially free of ultraviolet radiation absorbing agents if the sealing composition comprises no more than 0.1% by weight ultraviolet radiation absorbing agents, based on the total weight of the sealing composition. As used herein, a sealing composition is completely free of ultraviolet radiation absorbing agents if ultraviolet radiation absorbing agents are not present in the sealing composition, i.e., 0% by weight.

According to the present invention, the sealing composition may be substantially free, essentially free, or completely free of organic polymers. As used herein, the term "organic polymers" refers to stand-alone organic polymers and resins, such as alkyds, acrylic, polybutene, and the like, that are not a constituent component of the polysiloxane or reactive polysiloxane. As used herein, a sealing composition is substantially free of organic polymers if the sealing composition comprises no more than 1% by weight organic polymers, based on the total weight of the sealing composition. As used herein, a sealing composition is essentially free of organic polymers if the sealing composition comprises no more than 0.5% by weight organic polymers, based on the total weight of the sealing composition. As used herein, a sealing composition is completely free of organic polymers if organic polymers are not present in the sealing composition, i.e., 0% by weight.

According to the present invention, the sealing composition may have a pH of 5 to 10, such as 6 to 9, such as 7 to 8.

According to the present invention, the sealing composition may be substantially free, essentially free, or completely free of protonating agent. As used herein, the term "protonating agent" refers to monoprotic or multiprotic, organic or inorganic acids.

According to the present invention, the sealing composition in the concentrated form may have a viscosity of at least 4 centistokes (cST) as measured by an efflux cup according to ASTM D4212, such as at least 20 cST, such as at least 400 cST, and may be no more than 1,200 cST, such as no more than 800 cST. The sealing composition in the concentrated form may have a viscosity of 4 cST to 1,200 cST, such as 20 cST to 800 cST, such as 400 cST to 800 cST. It will be understood that sealing compositions having a higher viscosity may need to be measured according to ASTM D1200 once the viscosity exceeds the upper limit of ASTM D4212.

According to the present invention, the sealing composition in the diluted form may have a viscosity of at least 1 cST as measured by an efflux cup according to ASTM D4212, such as at least 2 cST, such as at least 2.3 cST, and may be no more than 5 cST, such as no more than 3 cST, such as no more than 2.8 cST. The sealing composition in the diluted form may have a viscosity of 1 cST to 5 cST, such as 2 cST to 3 cST, such as 2.3 cST to 2.8 cST.

According to the present invention, the sealing composition may be stable at ambient conditions for at least 60 days. As used herein, the term "stable" with respect to the sealing composition refers to a sealing composition wherein the pH value does not change more than one unit, and the viscosity does not increase to cause a gelation of the composition or decrease such that settling occurs. As used herein, the term "ambient conditions" refers to a temperature of about 25° C. and 50% relative humidity.

According to the present invention, the sealing composition may comprise a low-VOC sealing composition. The volatile organic content of the sealing composition may depend upon the final end use of the composition. For example, a higher-VOC level may be used for cementitious substrates. The volatile organic content of the sealing composition may be less than 400 g/L, such as less than 350 g/L, such as less than 300 g/L, such as less than 150 g/L, such as less than 100 g/L, such as less than 50 g/L, as measured according to EPA Method 24. As will be understood, the volatile organic content of the sealing composition includes any volatile organic compounds present in the sealing composition, such as, for example, organic solvents, as well as any volatile organic compounds generated from reaction of the components of the sealing composition. For example, alkoxy groups may be converted into volatile organic alcohols through hydrolysis and/or condensation reactions. The volatile organic content accounts for the organic content present in the sealing composition and generated by the components of the sealing composition.

The sealing composition of the present invention may be stored in a flexible packaging. The flexible packaging may be made of any flexible material that is compatible, i.e., non-reactive, with the sealing composition. The flexible packaging may comprise, for example, polyethylene. The flexible packaging may optionally comprise a barrier layer. The flexible packaging may comprise a transparent portion that allows the sealing composition to be visible while inside the package. The flexible packaging may be in the form of a pouch or bag. Accordingly, the present invention is also directed to a flexible packaging comprising the sealing composition of the present invention.

The present invention is also directed to a method of coating a substrate comprising applying the sealing composition of the present invention to the surface of the substrate.

The sealing composition may be applied to the substrate by any method known in the art. For example, the sealing composition may be applied by brush, roller, wipe, cloths, spray-pump, pneumatic sprayer, airless sprayer, a hose-adapter, or by combinations of these techniques. A sufficient amount of sealing composition may be applied such that water beads on the surface of the substrate after curing of the sealing composition.

After application of the sealing composition to the substrate, the sealing composition may optionally be allowed to dry and cure under ambient conditions. The amount of time necessary to cure may depend on various factors, including the environmental factors such as temperature and humidity, and the substrate being coated, but may be less than 1 hour, such as about 1 hour to about 4 hours, such as less than 24 hours, such as at least 24 hours under ambient conditions. The temperature of the environment is not critical as the sealing composition may be applied and cured at any environmental temperature above the freezing point of the sealing composition.

Optionally, the method may further comprise pre-wetting the substrate with water prior to applying the sealing composition such that the sealing composition is applied to a wet surface of the substrate.

The method may also optionally comprise cleaning the substrate surface with a cleaning composition prior to (optionally) wetting the surface and applying the sealing composition. The cleaning composition may be an oxalic acid-based cleaning composition. The cleaning composition may also comprise any detergent known in the art. For example, the cleaning composition may comprise bleach, sodium hypochlorite, sodium hydroxide, calcium hypochlorite, sodium percarbonate, citric based wood cleaners, and the like. The cleaning composition may be applied by any technique known in the art. For example, the cleaning composition may be applied by brush, roller, wipe, spray-pump, pneumatic sprayer, airless sprayer, pressuring washing, and the like.

The method may also optionally comprise diluting the sealing composition concentrate with water prior to applying the sealing composition to the substrate. When the sealing composition is in the form of a concentrate, the sealing composition may be diluted with water prior to application to the substrate. The dilution may be performed by diluting 1 part sealing composition concentrate in 9 to 44 parts water. The dilution may be performed by diluting 1 part sealing composition concentrate in 9 parts water, such as 17 parts water, such as 19 parts water, such as 44 parts water. Additionally, the dilution may be performed by a hose-adapter wherein the sealing composition concentrate is metered into a stream of water from a hose to form the diluted sealing composition at the point of application.

The substrate may comprise a porous material such as a cellulosic material, cementitious material, composite material, or a material previously coated with a coating. The substrate may also comprise metal substrates, metal alloy substrates, and/or substrates that have been metallized, such as nickel-plated plastic. Non-limiting cellulosic materials may include, for example, wood-based products including wood and composite wood, such as lumber, plywood, oriented strand board. Suitable cementitious material may include, for example, masonry materials such as cement, concrete, bricks and blocks. Suitable composite materials may include, for example, synthetic materials such as synthetic wood. Material previously coated with a coating may include any of the above-mentioned substrates that have been previously coated with a coating. The coating may be the same or different than the sealing composition described herein, and may comprise a sealant, toner, stain, or transparent, semi-transparent or opaque coating, or combinations thereof. The coating may also comprise a weathered coating. As used herein, the term "weathered coating" refers to a previously applied coating that has deteriorated such that water no longer beads on the surface of the weathered coating. The weathered coating may be a sealant, toner, stain, or transparent, semi-transparent or opaque coating, or combinations thereof. The coating or weathered coating may be at least partially removed by the optional cleaning step described above. However, the sealing composition could be applied to the substrate with the coating or weathered coating without removing any of the coating.

The present invention is also directed to a substrate at least partially coated by the sealing composition of the present invention. The coating on the substrate may be in an at least partially cured state. The coated substrate may for example be obtained according to the afore-mentioned method of coating a substrate according to the present invention. As discussed above, the substrate may be porous and the sealing composition may penetrate and at least partially impregnate into the porous substrate. The at least partially cured sealing composition may coat the porous structure of the substrate, such as, for example, the cellulose fibers of wood, and be present as a non-continuous film on the substrate surface. The substrates may comprise any of the substrates described above.

According to the present invention, the surface of the coated substrate may have a decreased surface tension compared to the corresponding uncoated substrate. As used herein the term "corresponding uncoated substrate" means a substrate, which is the same as the coated substrate except that it is no coated with the sealing composition of the present invention. For the sake of clarity, a "corresponding uncoated substrate" thus includes substrates, which may or may not have one or more coating such as a previously applied coating material as set forth above. The decreased surface tension may be demonstrated by water beading on the surface of the coated substrate. The surface tension may be measured by applying solutions with known surface tensions onto the surface of the substrate. The solutions may comprise varying amounts of water and ethanol. The surface tension may be determined when a droplet of the solution with a known surface tension flattens and no contact angle is observed for the droplet on the surface. The surface tension of the coated substrate may be less than 40 dynes/cm, such as less than 35 dynes/cm, such as less than 30 dynes/cm. The surface tension of the coated substrate may be reduced by at least 30%, such as at least 40%, such as at least 45%, with respect to a corresponding uncoated substrate. In addition, according to the present invention, the surface of the coated substrate may have a decreased surface tension compared to an uncoated substrate after exposure of the substrates to QUV in a Q-panel basic model for 1000 hours. The surface tension of the coated substrate may be reduced by at least 30%, such as at least 40%, such as at least 45%, with respect to a corresponding uncoated substrate after exposure of the substrates to QUV in a Q-panel basic model for 1000 hours.

According to the present invention, the coated substrate may also have less water absorbance compared to a corresponding uncoated substrate.

The sealing composition may be in the form of a clear or transparent coating upon cure. Additionally, the sealing composition may be in the form of a semi-transparent or opaque coating upon cure, depending on the presence of colorants in the composition. The sealing composition may also be a penetrative coating that penetrates into the pores of the substrate material to at least partially impregnate and cure.

As used herein, the sealing composition is "substantially free" of a component if the component is present in an amount of less than 0.1% by weight, based on the total solids weight of the sealing composition. The sealing composition is "essentially free" of a component if the component is present in an amount of less than 0.01% by weight, based on the total solids weight of the sealing composition. The sealing composition is "completely free" a component if the component is not present in the sealing composition, i.e., 0.00% by weight, based on the total solids weight of the sealing composition.

For purposes of this detailed description, it is to be understood that the invention may assume alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

In this application, the use of the singular includes the plural and plural encompasses singular, unless specifically stated otherwise. For example, although reference is made herein to "a" polysiloxane, "a" reactive polysiloxane, "a" reactive functional group, "an" amino-functional polysiloxane, "a" hydroxyl-functional polysiloxane, "a" silsesquioxane, "a" cyclic polysiloxane, "an" alkoxy silane, and "a" thickener, a combination (i.e., a plurality) of these components may be used. In addition, in this application, the use of "or" means "and/or" unless specifically stated otherwise, even though "and/or" may be explicitly used in certain instances.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

ASPECTS

In view of the foregoing, the present invention thus relates in particular, without being limited thereto, to the following aspects:

1. A sealing composition comprising:
   (a) a polysiloxane;
   (b) a reactive polysiloxane comprising at least one reactive functional group; and
   (c) water;
wherein the solids weight ratio of polysiloxane to reactive polysiloxane is from 1.7:1 to 4:1.

2. The sealing composition of preceding Aspect 1, wherein the polysiloxane comprises at least one silicone resin.

3. The sealing composition of any one of Aspects 1 or 2, wherein the polysiloxane comprises at least one polysiloxane comprising alkoxy groups and/or comprising (meth)acrylate groups, polyether groups, or a combination thereof.

4. The sealing composition according to any one of the preceding Aspects, wherein the reactive functional group of the reactive polysiloxane is selected from primary amino groups, secondary amino groups, hydroxyl groups, or a combination thereof.

5. The sealing composition according to any one of the preceding Aspects, wherein the reactive polysiloxane comprises an amino-functional polysiloxane, a hydroxyl-functional polysiloxane or a combination thereof.

6. The sealing composition according to any one of the preceding Aspects, wherein the reactive polysiloxane comprises a polydimethylsiloxane comprising at least one active hydrogen-containing functional group, a silsesquioxane comprising at least one active hydrogen-containing functional group, or a combination thereof, wherein the at least one active hydrogen-containing functional group is selected from primary amino groups, secondary amino groups, hydroxyl groups, or a combination thereof.

7. The sealing composition according to any one of the preceding Aspects, wherein the solids weight ratio of polysiloxane to reactive polysiloxane is from 1.7:1 to 4:1, such as 2:1 to 4:1, such as 2:1 to 3.5:1, such as 2:1 to 3:1, such as 2.1:1 to 3:1, such as 2.2:1 to 2.9:1, such as 2.2:1 to 2.5:1.

8. The sealing composition according to any one of the preceding Aspects, further comprising an alkoxy silane.

9. The sealing composition according to any one of Aspects 1 to 7, wherein the sealing composition is substantially free of alkoxy silane.

10. The sealing composition according to any one of the preceding Aspects, wherein the sealing composition comprises a sealing composition concentrate having total solids of 30% to 70%, based on the total weight of the sealing composition, and/or a viscosity of 4 cST to 1,200 cST.

11. The sealing composition according to any one of Aspects 1 to 9, wherein the sealing composition comprises a diluted sealing composition having total solids of 0.5% to 10% by weight, based on the total weight of the sealing composition, and/or a viscosity of 1 cST to 5 cST.

12. The sealing composition according to any of the preceding Aspects, wherein the sealing composition comprises the polysiloxane in an amount of 20% to 82% by weight, such as 60% to 80% by weight, such as 66% to 75% by weight, such as 68% to 72% by weight, based on the total solids weight of the sealing composition; and the reactive polysiloxane present in an amount of 8% to 42% by weight, such as 20% to 40% by weight, such as 25% to 34% by weight, such as 28% to 32% by weight, based on the total solids weight of the sealing composition.

13. The sealing composition according to any one of the preceding Aspects, further comprising an acrylic resin.

14. The sealing composition of Aspect 13, wherein the acrylic resin is present in an amount of 5% to 65% by weight, such as 40% to 60% by weight, such as 50% to 57% by weight, based on the total solids weight of the sealing composition.

15. The sealing composition according to any one of the preceding Aspects, further comprising a thickener, fungicide, biocide, mildewcide, dispersant, surfactant, wetting agent, hindered amine light stabilizer, ultraviolet radiation absorber, wax, or a combination thereof.

16. The sealing composition according to any one of the preceding Aspects, wherein the volatile organic content of the sealing composition is less than 400 g/L, as measured according to EPA Method 24.

17. The sealing composition according to any one of the preceding Aspects, wherein the sealing composition is stable for at least 60 days.

18. The sealing composition according to any one of the preceding Aspects, wherein the sealing composition is substantially free of ultraviolet radiation absorbing agents.

19. The sealing composition according to any one of the preceding Aspects further comprising a colorant.

20. A flexible packaging comprising a sealing composition according to any one of preceding Aspects 1 to 19.

21. A method of coating a substrate comprising applying a sealing composition according to any one of Aspects 1 to 19 to at least a portion of a surface of the substrate.

22. The method according to Aspect 21, further comprising allowing the applied sealing composition to cure under ambient conditions.

23. The method according to any one of Aspects 21 or 22, wherein applying the sealing composition to the surface of the substrate comprises application by wipe, brush, roller, spray pump, hose-adapter, or a combination thereof.

24. The method according to any one of Aspects 21 to 22, wherein the substrate is a porous substrate comprising a cellulosic material, a cementitious material, a composite material, or a material previously coated with a coating.

25. The method according to any one of Aspects 21 to 24, further comprising pre-wetting the substrate with water prior to applying the sealing composition such that the sealing composition is applied to a wet surface of the substrate.

26. The method according to any one of Aspects 21 to 25, further comprising cleaning the substrate surface with a cleaning composition prior to applying the sealing composition.

27. The method according to any one of Aspects 21 to 26, wherein the sealing composition comprises a sealing composition concentrate, and the method further comprises diluting the sealing composition concentrate with water prior to applying the sealing composition to the substrate.

28. A substrate at least partially coated by a sealing composition according to any one of Aspects 1 to 15, for example obtained according to the method of any one of Aspects 21 to 27.

29. The coated substrate according to preceding Aspect 28, wherein the substrate is porous and the sealing composition at least partially impregnates into the porous substrate.

30. The coated substrate of according to any one of Aspects 28 or 29, wherein the substrate comprises a cellulosic material, a cementitious material, a composite material, or a material previously coated with a coating.

31. The coated substrate according to any one of Aspects 28 to 30, wherein the coated substrate has a surface tension of less than 40 dynes/cm.

32. The coated substrate according to any one of Aspects 28 to 31, wherein the surface tension of the coated substrate is reduced by at least 30% with respect to the corresponding uncoated substrate.

33. The coated substrate according to any one of Aspects 28 to 32, wherein the water absorbance of the coated substrate is less than the water absorbance of the corresponding comparative uncoated substrate.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

TABLE 1

| Ingredients | | |
|---|---|---|
| Material | % Total Composition Wt. | % of Solids |
| Silres BS 60[1] | 67.36 | 68.8 |
| Silres BS 1360[2] | 27.77 | 31.2 |
| Water | 4.87 | — |

[1]Solventless emulsion of a silicone resin commercially available from Wacker Chemical Corporation (60% solids in water)
[2]Nonionic, solvent-free emulsion of a reactive polysiloxane commercially available from Wacker Chemical Corporation (66% solids in water)

A composition according to Table 1 was prepared as follows: At ambient temperature (20° C. +/−5° C.) and humidity (</=50%), the Silres BS60 component was charged into a 946 mL stainless steel vessel with rounded corners. A stainless steel 4 blade turbine type impeller, 44.45 mm in diameter, attached to a 292 mm in length and 6.35 mm in diameter stainless steel shaft, was immersed into Silres BS60 such that all 4 blades were completely covered by liquid. The shaft was then fixed to a 746-watt benchtop air motor stirrer model number ZZ 30A from Fawcett. The air motor was turned on low speed or 1500 RPM. The agitation speed remained constant for the entire process. The Silres BS1360 component was then added to the vessel while Silres BS60 was under agitation. Tap water was then added under agitation on top of the Silres BS60 and Silres BS1360 mixture. The resultant mixture was agitated for 30 minutes after the tap water was added. The temperature of the mixture did not exceed 37° C.

Example 2

TABLE 2

| Ingredients | | |
|---|---|---|
| Material | % Total Composition Wt. | % of Solids |
| Silres BS 60[1] | 67.36 | 74.4 |
| Silres BS 1340[2] | 27.77 | 25.6 |
| Water | 4.87 | — |

[1]Solventless emulsion of a silicone resin commercially available from Wacker Chemical Corporation (60% solids in water)
[2]Nonionic, solvent-free emulsion of a reactive polysiloxane commercially available from Wacker Chemical Corporation (50% solids in water)

A composition according to Table 2 was prepared as follows: At ambient temperature (20° C. +/−5° C.) and humidity (</=50%), the Silres BS60 component was charged into a 946 mL stainless steel vessel with rounded corners. A stainless steel 4 blade turbine type impeller, 44.45 mm in diameter, attached to a 292 mm in length and 6.35 mm in diameter stainless steel shaft, was immersed into the Silres BS60 such that all 4 blades were completely covered by liquid. The shaft was fixed to a 746-watt benchtop air motor stirrer model number ZZ 30A from Fawcett. The air motor was turned on low speed or 1500 RPM. The agitation speed remained constant for the entire process. The Silres BS1340 component was then added to the vessel while Silres BS60 was under agitation. Tap water was then added under agitation on top of the Silres BS60 and Silres BS1340 mixture. The resultant mixture was agitated for 30 minutes after the tap water was added. The temperature of the mixture did not exceed 37° C.

Example 3

TABLE 3

| Ingredients | | |
|---|---|---|
| Material | % Total Composition Wt. | % of Solids |
| Silres BS 60[1] | 38.01 | 68.9 |
| Silres BS 1360[2] | 15.67 | 31.1 |
| Water | 46.32 | — |

[1]Solventless emulsion of a silicone resin commercially available from Wacker Chemical Corporation (60% solids in water)
[2]Nonionic, solvent-free emulsion of a reactive polysiloxane commercially available from Wacker Chemical Corporation (66% solids in water)

A composition according to Table 3 was prepared as follows: At ambient temperature 20° C. +/−5° C. and humidity (</=50%), the Silres BS60 component was charged into a 946 mL stainless steel vessel with rounded corners. A stainless steel 4 blade turbine type impeller, 44.45 mm in diameter, attached to a 292 mm in length and 6.35 mm in diameter stainless steel shaft, was immersed into Silres BS60 such that all 4 blades were completely covered by liquid. The shaft was then fixed to a 746-watt benchtop air motor stirrer model number ZZ 30A from Fawcett. The air motor was turned on low speed or 1500 RPM. The agitation speed remained constant for the entire process. The Silres BS1360 component was then added to the vessel while Silres BS60 was under agitation. Tap water was then added on top of the Silres BS50 and Silres BS1360 mixture under agitation. The resultant mixture was agitated for 30 minutes after the tap water was added. The temperature of the mixture did not exceed 37° C.

Example 4

TABLE 4

| Ingredients | | |
|---|---|---|
| Material | Percentage | % of Solids |
| Silres BS 60[1] | 38.01 | 74.5 |
| Silres BS 1340[2] | 15.67 | 25.5 |
| Water | 46.32 | — |

[1]Solventless emulsion of a silicone resin commercially available from Wacker Chemical Corporation (60% solids in water)
[2]Nonionic, solvent-free emulsion of a reactive polysiloxane commercially available from Wacker Chemical Corporation (50% solids in water)

A composition according to Table 4 was prepared as follows: At ambient temperature 20° C. +/−5° C. and humidity (</=50%), the Silres BS60 component was charged into a 946 mL stainless steel vessel with rounded corners. A stainless steel 4 blade turbine type impeller, 44.45 mm in diameter, attached to a 292 mm in length and 6.35 mm in diameter stainless steel shaft, was immersed into Silres BS60 such that all 4 blades were completely covered by liquid. The shaft was then fixed to a 746-watt benchtop air motor stirrer model number ZZ 30A from Fawcett. The air motor was turned on low speed or 1500 RPM. The speed remained constant for the entire process. The Silres BS1360 component was then added to the vessel while Silres BS60 was under agitation. Tap water was then added on top of the Silres BS60 and Silres BS1360 mixture under agitation. The resultant mixture was agitated for 30 minutes after the tap water was added. The temperature of the mixture did not exceed 37° C.

Evaluation of Example Sealing Compositions

The four example mixtures prepared as set forth above were evaluated for weight per gallon, pH and viscosity at ambient laboratory conditions. Weight per gallon was measured using a stainless steel mini weight per gallon cup from Paul N. Gardner Company, Inc. as well as a Mettler PE 600 balance. The pH was measured using an Accumet Basic model number AB15 Plus pH meter. The viscosity was measured using a Shell efflux dip cup according to ASTM D4212. Volatile organic content (VOC) was determined according to EPA Method 24 with no exempts subtracted. The results are presented in Table 5 below.

TABLE 5

| Sealing Composition Concentrate Properties | | | | | |
|---|---|---|---|---|---|
| Example | weight/gallon | | viscosity | | VOC |
| Number | (lbs./gal.) | pH | Efflux cup | time/cST | (g/L) |
| 1 | 8.80 | 9.76 | Shell #3 | 28 sec/39 cST | 110.6 |
| 2 | 8.82 | 7.88 | Shell #2 | 47 sec/24 cST | 108 |
| 3 | 8.57 | 9.70 | Shell #1 | 34 sec/4.7 cST | 121 |
| 4 | 8.58 | 7.84 | Shell #1 | 33 sec/4.5 cST | 83.7 |

The four example mixtures were evaluated for water-beading and surface tension. To determine water-beading, the examples were diluted with water as follows.

TABLE 6

| Dilution of Concentrated Sealing Compositions | | |
|---|---|---|
| Example Mixture Number | Amount of Example Mixture (%) | Amount of tap Water (%) |
| 1 | 5% | 95% |
| 2 | 5% | 95% |
| 3 | 10% | 90% |
| 4 | 10% | 90% |

The diluted mixtures were stirred with a spatula to ensure uniformity. Two coats of the diluted mixtures were applied wet on wet to individual 76.2 mm by 152.4 mm by 6.4 mm thick pieces of pressure-treated pine lumber (PTL) and concrete panels with a nylon bristle brush. After 1 hour of drying, tap water was applied with a plastic pipette to the treated surface of the substrate and a comparative uncoated "blank" substrate, and water-beading was immediately visually rated according to Table 7. The higher the contact angle of water-beading indicates a more water-repellant surface. The procedure was repeated after 24 hours of drying and again after the panels were exposed to QUV in a Q-panel basic model for 1000 hours. The repeating cycle in QUV was 8 hours at 50° C. then 4 hours of condensation at 50° C. The evaluations were run in triplicate. The results are presented in Table 8 below.

TABLE 7

| Rating | Description |
|---|---|
| 10 | High contact angle water-beading |
| 5 | Low contact angle water-beading |
| 0 | No water-beading |

TABLE 8

| Description | 1 hour PTL | 24 hour PTL | 1000 hours - QUV - PTL | 1 hour - concrete | 24 hour - concrete | 1000 hours - QUV - concrete |
|---|---|---|---|---|---|---|
| Blank | 0 | 0 | 0 | 0 | 0 | 0 |
|  | 0 | 0 | 0 | 0 | 0 | 0 |
|  | 0 | 0 | 0 | 0 | 0 | 0 |
| Example 1 | 5 | 10 | 10 | 10 | 10 | 0 |
|  | 5 | 10 | 10 | 10 | 10 | 0 |
|  | 5 | 10 | 10 | 10 | 10 | 5 |
| Example 2 | 5 | 10 | 10 | 10 | 10 | 0 |
|  | 5 | 10 | 10 | 10 | 10 | 0 |
|  | 5 | 10 | 10 | 10 | 10 | 0 |
| Example 3 | 5 | 10 | 10 | 10 | 10 | 0 |
|  | 5 | 10 | 10 | 10 | 10 | 5 |
|  | 5 | 10 | 10 | 10 | 10 | 0 |
| Example 4 | 5 | 10 | 10 | 10 | 10 | 0 |
|  | 5 | 10 | 10 | 10 | 10 | 5 |
|  | 5 | 10 | 10 | 10 | 10 | 0 |

Water-beading was also examined when the application temperature of the sealing composition was varied and with substrates that were soaked in water for 24 hours prior to application of the sealing composition. A comparative uncoated "blank" was also evaluated. The panels were allowed to dry for 1 hour at ambient lab conditions before being visually rated. The panels were rated again after 24 hours of dry time. Results are provided in Tables 9 and 10.

TABLE 9

Water beading after 1 hour of dry time

| Description | PTL - room temp. | concrete - room temp. | PTL - at 4° C. | concrete - at 4° C. | PTL - at 50° C. | concrete - at 50° C. | PTL - soaked in water 24 hours | concrete - soaked in water 24 hours |
|---|---|---|---|---|---|---|---|---|
| Blank | 0 | 0 | 0 | 0 | 0 | 0 | 0 | 0 |
| Example 1 | 5 | 10 | 5 | 0 | 10 | 10 | 0 | 0 |
| Example 2 | 5 | 10 | 5 | 5 | 10 | 10 | 0 | 0 |
| Example 3 | 5 | 10 | 5 | 0 | 10 | 10 | 0 | 0 |
| Example 4 | 5 | 10 | 5 | 5 | 10 | 10 | 0 | 0 |

TABLE 10

Water beading after 24 hours of dry time

| Description | PTL - room temperature | concrete - room temperature | PTL - at 4° C. | concrete - at 4° C. | PTL - at 50° C. | concrete - at 50° C. | PTL - soaked in water 24 hours | concrete - soaked in water 24 hours |
|---|---|---|---|---|---|---|---|---|
| Blank | 0 | 0 | 0 | 0 | 0 | 0 | 0 | 0 |
| Example 1 | 10 | 10 | 5 | 5 | 10 | 10 | 10 | 0 |
| Example 2 | 10 | 10 | 5 | 5 | 10 | 10 | 10 | 5 |
| Example 3 | 10 | 10 | 5 | 5 | 10 | 10 | 10 | 0 |
| Example 4 | 10 | 10 | 5 | 5 | 10 | 10 | 10 | 5 |

To determine surface tension, the example mixtures were diluted with water as described in Table 6. The diluted mixtures were stirred with a spatula to ensure uniformity. Two coats of the diluted mixtures were applied wet on wet to individual 76.2 mm by 152.4 mm by 6.4 mm thick pieces of pressure-treated pine lumber (PTL) and concrete panels with a nylon bristle brush and compared to a comparative uncoated "blank" substrate. The panels were allowed to dry for 1 hour. After an hour, various solutions of known surface tensions were applied to the panels. The surface tension on the panel was determined when a droplet of the solution flattened and no contact angle was observed. This procedure may be referred to as the SURFACE TENSION METHOD. Table 11 below provides the solutions of ethanol and water and the known surface tension that corresponds to the solution.

TABLE 11

| % WEIGHT WATER | % WEIGHT ETHANOL | SURFACE TENSION DYNES/CM |
|---|---|---|
| 0 | 100 | 22 |
| 5.66 | 94.34 | 23 |
| 12.4 | 87.6 | 24 |

TABLE 11-continued

| % WEIGHT WATER | % WEIGHT ETHANOL | SURFACE TENSION DYNES/CM |
|---|---|---|
| 20.11 | 79.89 | 25 |
| 27.56 | 72.44 | 26 |
| 35.31 | 64.69 | 27 |
| 44.37 | 55.63 | 28 |
| 51.54 | 48.46 | 29 |
| 56.52 | 43.49 | 30 |
| 60.89 | 39.11 | 31 |
| 64.7 | 38.02 | 32 |
| 67.98 | 35.31 | 33 |
| 70.75 | 29.25 | 34 |
| 72.57 | 27.43 | 35 |
| 74.83 | 25.17 | 36 |
| 76.61 | 23.39 | 37 |
| 78.38 | 21.62 | 38 |
| 79.04 | 20.96 | 39 |
| 81.22 | 18.78 | 40 |
| 82.52 | 17.48 | 41 |
| 83.6 | 16.4 | 42 |
| 84.88 | 15.12 | 43 |
| 86.14 | 13.86 | 44 |
| 86.99 | 13.01 | 45 |
| 88.04 | 11.96 | 46 |
| 89.08 | 10.92 | 47 |
| 89.92 | 10.08 | 48 |
| 90.74 | 9.26 | 49 |
| 91.36 | 8.64 | 50 |

The evaluation was performed after 24 hours as well and again after the panels were exposed to QUV in a Q-panel basic model for 1000 hours. The repeating cycle in QUV was 8 hours at 50° C. then 4 hours of condensation at 50° C. Evaluations were run in triplicate. Results are provided in Table 12.

TABLE 12

| | Surface Tension - Dynes/cm | | | | | |
|---|---|---|---|---|---|---|
| Description | 1 hour PTL | 24 hour PTL | 1000 hours - QUV - PTL | 1 hour - concrete | 24 hour concrete | 1000 hours - QUV - concrete |
| Blank | 49 | 49 | >50 | >50 | >50 | >50 |
| | 49 | 49 | >50 | >50 | >50 | >50 |
| | 49 | 49 | >50 | >50 | >50 | >50 |
| Example 1 | 26 | 26 | 26 | 26 | 26 | >50 |
| | 26 | 26 | 25 | 26 | 26 | >50 |
| | 26 | 26 | 25 | 26 | 26 | 30 |
| Example 2 | 26 | 26 | 24 | 29 | 26 | >50 |
| | 26 | 26 | 23 | 26 | 26 | >50 |
| | 26 | 26 | 26 | 29 | 29 | >50 |
| Example 3 | 26 | 26 | 24 | 27 | 27 | >50 |
| | 26 | 26 | 26 | 27 | 27 | 30 |
| | 26 | 26 | 24 | 27 | 27 | >50 |
| Example 4 | 26 | 27 | 26 | 27 | 27 | >50 |
| | 26 | 26 | 26 | 27 | 27 | 30 |
| | 26 | 26 | 25 | 28 | 28 | >50 |

To determine stability, all four example mixtures were allowed to sit undisturbed for two months at ambient laboratory conditions. After two months, the mixtures were stirred with a spatula to ensure uniformity. Viscosity and pH were then measured and compared to the initial results. The same instrumentation was utilized when the initial results were recorded. Results are provided in Table 13.

TABLE 13

| Example Number | pH - initial | viscosity - initial Efflux cup time/cps | | pH - 60 days | viscosity - 60 days Efflux cup time/cps | |
|---|---|---|---|---|---|---|
| 1 | 9.76 | Shell #3 | 28 sec/39 cST | 9.17 | Shell #3 | 24 sec/33 cST |
| 2 | 7.88 | Shell #2 | 47 sec/24 cST | 7.81 | Shell #2 | 49 sec/25 cST |
| 3 | 9.70 | Shell #1 | 34 sec/4.7 cST | 9.48 | Shell #1 | 30 sec/3.8 cST |
| 4 | 7.84 | Shell #1 | 33 sec/4.5 cST | 7.86 | Shell #1 | 30 sec/3.8 cST |

Table 8, Table 9, and Table 10 show water-beading performance that are improved over the comparative blank on both pressure-treated pine and concrete even when application conditions are varied. Table 12 provides that the example mixtures reduce surface tension when compared to a comparative blank. Table 13 provides that the examples mixtures are stable over sixty days or two months at ambient lab conditions.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. A sealing composition comprising:
    (a) a polysiloxane, wherein the polysiloxane comprises alkoxy groups;
    (b) a reactive polysiloxane comprising at least one reactive functional group; and
    (c) water;
    wherein the solids weight ratio of polysiloxane to reactive polysiloxane is from 1.7:1 to 4:1.
2. The sealing composition of claim 1, wherein the polysiloxane comprises at least one silicone resin.
3. The sealing composition of claim 1, wherein the polysiloxane further comprises (meth)acrylate groups, polyether groups, or combinations thereof.
4. The sealing composition of claim 1, wherein the reactive polysiloxane comprises an amino-functional polysiloxane, a hydroxyl-functional polysiloxane, or combinations thereof.
5. The sealing composition of claim 1, wherein the reactive polysiloxane comprises a polydimethylsiloxane comprising at least one reactive functional group, a silsesquioxane comprising at least one reactive functional group, or combinations thereof.
6. The sealing composition of claim 1, further comprising an alkoxy silane.
7. The sealing composition of claim 1, wherein the sealing composition is substantially free of alkoxy silane.
8. The sealing composition of claim 1, further comprising a colorant.
9. The sealing composition of claim 1, wherein sealing composition comprises a sealing composition concentrate having total solids of 30% to 70%, based on the total weight of the sealing composition, and a viscosity of 4 cST to 1,200 cST at ambient conditions, as measured by an efflux cup according to ASTM D4212.
10. The sealing composition of claim 1, wherein the sealing composition comprises a diluted sealing composition having total solids of 0.5% to 10% by weight, based on the total weight of the sealing composition, and a viscosity of 1 cST to 5 cST at ambient conditions, as measured by an efflux cup according to ASTM D4212.
11. The sealing composition of claim 1, further comprising a thickener, fungicide, biocide, mildewcide, dispersant, surfactant, wetting agent, hindered amine light stabilizer, ultraviolet radiation absorber, wax, acrylic resin, or combinations thereof.
12. The sealing composition of claim 1, wherein the volatile organic content of the sealing composition is less than 400 g/L, as measured according to EPA Method 24.
13. The sealing composition of claim 1, wherein the sealing composition is stable for at least 60 days.
14. The sealing composition of claim 1, wherein the sealing composition is substantially free of ultraviolet radiation absorbing agents.
15. A flexible packaging kit comprising a flexible packaging and a flexible material having the sealing composition of claim 1 stored inside the flexible packaging.
16. A method of coating a substrate comprising applying a sealing composition to at least a portion of a surface of the substrate, wherein the sealing composition comprises:
    (a) a polysiloxane;
    (b) a reactive polysiloxane comprising at least one reactive functional group; and
    (c) water;
    wherein the solids weight ratio of polysiloxane to reactive polysiloxane is from 1.7:1 to 4:1.
17. The method of claim 16, wherein applying the sealing composition to the surface of the substrate comprises application by wipe, brush, roller, spray pump, hose-adapter, or combinations thereof.
18. The method of claim 16, wherein the substrate is a porous substrate comprising comprises a cellulosic material, cementitious material, composite material, or a material previously coated with a coating.
19. The method of claim 16, further comprising pre-wetting the substrate with water prior to applying the sealing composition such that the sealing composition is applied to a wet surface of the substrate.
20. The method of claim 16, further comprising cleaning the substrate surface with a cleaning composition prior to applying the sealing composition.
21. The method of claim 16, wherein the sealing composition comprises a sealing composition concentrate, and the method further comprises diluting the sealing composition concentrate with water prior to applying the sealing composition to the substrate.
22. A substrate at least partially coated by a sealing composition, wherein the sealing composition comprises:
    (a) a polysiloxane;
    (b) a reactive polysiloxane comprising at least one reactive functional group; and
    (c) water;
    wherein the solids weight ratio of polysiloxane to reactive polysiloxane is from 1.7:1 to 4:1.
23. The substrate of claim 22, wherein the sealing composition at least partially impregnates into the substrate.
24. The substrate of claim 22, wherein the substrate comprises a cellulosic material, cementitious material, composite material, or a material previously coated with a coating.
25. The substrate of claim 22, wherein the substrate has a surface tension of less than 40 dynes/cm, as measured by the SURFACE TENSION METHOD.
26. The substrate of claim 22, wherein the surface tension of the substrate is reduced by at least 30% with respect to a corresponding uncoated substrate.

* * * * *